United States Patent [19]  [11]  4,158,714
Brichta et al.  [45]  Jun. 19, 1979

[54] PROCESS FOR IMPARTING A BETTER ADHESION BETWEEN REINFORCING MATERIALS AND PLASTIC MATRIX AND PRODUCT THEREBY PRODUCED

[75] Inventors: Corrado Brichta, Milan; Natale Tettamanzi, Arenzano-Genova; Elio Rial, Milan, all of Italy

[73] Assignee: Vitrofil S.p.A., Milan, Italy

[21] Appl. No.: 750,911

[22] Filed: Dec. 15, 1976

[30] Foreign Application Priority Data

Dec. 18, 1975 [IT] Italy .............................. 30446 A/75
Dec. 18, 1975 [IT] Italy .............................. 30447 A/75

[51] Int. Cl.² .............................................. B32B 9/00
[52] U.S. Cl. .................................. 428/391; 427/387; 427/419 G; 428/392; 428/404; 528/425; B32B/25/20
[58] Field of Search ............... 427/419 R, 419 G, 387, 427/399; 428/391, 392, 404, 447; 260/46.5 E; 528/425

[56] References Cited

U.S. PATENT DOCUMENTS

| | | |
|---|---|---|
| 2,671,033 | 3/1954 | Waggoner ............................ 428/391 |
| 2,710,267 | 6/1955 | Boyd et al. ............................ 428/392 |
| 2,736,721 | 2/1956 | Dexter ............................ 260/37 SB |
| 2,920,981 | 1/1960 | Whitehurst ............................ 428/392 |
| 2,965,515 | 12/1960 | Jellinek ............................ 427/387 |
| 3,151,099 | 9/1964 | Ceyzeriat et al. ............... 260/46.5 G |
| 3,418,162 | 12/1968 | Adachi ............................ 427/387 |
| 3,627,565 | 12/1971 | Plueddemann ............................ 427/419 |
| 3,920,596 | 11/1975 | Furukawa ............................ 428/392 |
| 3,927,165 | 12/1975 | Grochol et al. ............................ 428/392 |
| 3,958,073 | 5/1976 | Trevisan et al. ............................ 427/387 |

Primary Examiner—Michael R. Lusignan
Assistant Examiner—Sadie L. Childs
Attorney, Agent, or Firm—Stevens, Davis, Miller & Mosher

[57] ABSTRACT

A process is described for imparting a better adhesion between reinforcing materials and a plastic matrix, characterized in that it comprises the steps of treating the reinforcing material surface with at least one organic compound of a tetravalent metal selected from the group consisting of zirconium and tin, at a temperature ranging from 250° to 650° C., of applying onto the reinforcing material surface so treated, at a lower temperature, at least one silane coupling agent and, finally, of drying the so-treated reinforcing material.

32 Claims, No Drawings

PROCESS FOR IMPARTING A BETTER ADHESION BETWEEN REINFORCING MATERIALS AND PLASTIC MATRIX AND PRODUCT THEREBY PRODUCED

The present invention relates to a process for imparting a better adhesion between the reinforcing materials for plastic materials and plastic matrixes, with which the reinforcing materials are used for producing reinforced composite materials.

The term "reinforcing materials" includes also mineral fillers.

Silicate materials, such as, e.g., glass in the form of either fibers or small-size balls, are generally employed as reinforcing materials.

The fillers generally used are mineral silicates, preferably in the form of powders, such as for example kaolin, mica, talc, wollastonite, asbestos, sand and quartz, as well as synthetic silicates, such as, for instance, calcium silicate, aluminum silicate, and silica gel. As fillers it is possible to use also alumina, silicon carbide and aluminum in powder form.

It is already known to treat a reinforcing material, such as, for example, glass fibers, with silane coupling agents with a view to improving the adhesion of the reinforcing material to the plastic matrix in order to obtain reinforced composite materials exhibiting improved mechanical characteristics.

These coupling agents are deposited onto the reinforcing material surface generally by adsorption from aqueous solutions.

However, the methods known so far do not permit obtaining excellent and permanent characteristics of adhesion between the reinforciing material and the plastic matrix, as alterations due to the environmental moisture may easily occur in the so-treated reinforcing material, either when handling the reinforcing materials prior to utilization, such as during transport, storage etc., or after they have been used together with the resin to obtain reinforced plastic material, or, finally, in the reinforced plastic material itself.

The alterations occuring in the reinforcing material result in a reduction or worsening of the mechanical properties of the so-reinforced composite materials.

Said alternations are generally due to the hydrolytic attack that the reinforcing material, treated according to the conventional methods, is subjected to when it is in the presence of environmental moisture and of water vapour; such alterations cause a gradual detaching, from the reinforcing material surface, of the thin layer consisting of the coupling agent that promotes the adhesion to the plastic material.

Actually, glass fibers treated with silane coupling agents, according to conventional techniques, generally exhibit characteristics of non-uniformity and non-homogeneity of their surface structure, which lead, when in the presence of moisture, to serious drawbacks, due to the gradual detaching, from the glass surface, of the thin layer promoting the adhesion in consequence of water adsorption.

Such phenomenon is particularly evident in the alkali-containing glass fiber, as the presence of alkaline ions on the glass surface brings about, due to a hydrolysis reaction, a gradual destruction of the surface film formed by the coupling agent, thus causing a worsening of the adhesion properties.

Thus, it is an object of the present invention to provide a process for obtaining a better adhesion between reinforcing materials and a plastic matrix, so as to remove, or at least to reduce, the above-mentioned drawbacks.

In particular, it is an object of this invention to obtain permanent adhesion properties between the reinforcing material and the plastic matrix.

A further object of this invention is to provide a process capable of preventing, or at least of reducing, the alterations occurring in the reinforcing material due to moisture, thus permitting one to obtain reinforced composite materials of better characteristics.

These and still other objects, that will more clearly appear to a technician skilled in the art from the detailed description given hereinafter, are advantageously attained by the following process for imparting a better adhesion between the reinforcing materials and the plastic matrix, this process, according to the present invention, comprising the steps of treating the reinforcing material surface with at least one organic compound of a tetravalent metal selected from the group consisting of zirconium and tin, at a temperature ranging from 250° to 650° C; of applying onto the reinforcing material surface so treated, at a lower temperature, at least one silane coupling agent; and, finally, of drying the so-treated reinforcing material.

The organic compound of the tetravalent metal has the following general formula:

$$M(OZ)_4$$

wherein:

M may be Zr or Sn;

(OZ) is an organic radical not hydrolyzable at room temperature in the presence of water, but hydrolyzable in the presence of water vapour at a temperature between 250° and 650° C.

The organic compound of the tetravalent metal may be also a polymeric derivative, containing a link of the type:

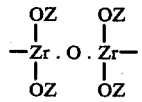

of a compound having the aforesaid formula $Zr(OZ)_4$, where the radical (OZ) has always the meaning indicated hereinbefore.

Among the zirconium organic compounds suited to the purpose we may cite the zirconium acid esters with the water-soluble polyvalent alcohols containing from 3 to 6 carbon atoms and at least 3 hydroxyl radicals, such as for example glycerine, pentaerythritol, sorbitol and mannitol; the amino-alkyl-zirconates obtained by reacting water-soluble amino-alcohols, such as for example diethyl-($\beta$-hydroxyethyl)-amine, tri-($\beta$-hydroxyethyl)-amine and methyl-bis-($\beta$-hydroxyethyl)-amine, with zirconium dioxy-hydrate or with zirconium alcoholates. p Furthermore we may cite the polymeric zirconates (condensed zirconium acid esters) complexed with water-soluble amino-alcohols and water-soluble polyvalent alcohols, the latter containing from three to six carbon atoms and at least three hydroxyl radicals, such as for instance isopropylzirconate polymer complexed with triethanolamine and glycerine.

Besides the compounds listed hereinbefore, among the zirconium organic compounds suited to the purpose we may cite also zirconium tetraacetate, $Zr(OCOCH_3)_4$, which is stable in water.

Amongst the tin organic compounds useful to the purpose we may cite the amino-alkyl-stannates prepared by reacting water-soluble amino-alcohols, such as for example diethyl-($\beta$-hydroxy-ethyl)-amine, tri-($\beta$-hydroxyethyl)-amine and methyl-bis-($\beta$-hydroxyethyl)-amine, with tin alcoholates; an example of such amino-alkyl-stannates being di-isopropyl-ditriethanolamine-stannate.

As previously mentioned, the organic compound of the tetravalent metal shall not hydrolyze in the presence of water at room temperature, but, conversely, it shall hydrolyze in the presence of water vapour at a temperature from 250° to 650° C., and it shall be stable in an aqueous solution.

"Aqueous solution" shall mean also a hydroalcoholic solution or an aqueous dispersion or a stable hydroalcoholic dispersion.

According to the present invention, the organic compound of the tetravalent metal is generally dissolved in water or in hydroalcoholic mixtures, at room temperature, thus obtaining a stable aqueous solution, i.e. a solution that does not give rise to precipitates.

The surface of the reinforcing material, e.g. glass fibers, is treated, by application of this solution, at a temperature from 250° to 650° C., and preferably from 350° to 550° C.

Heating up to the above-said temperature may occur either by applying the solution onto the reinforcing material while the reinforcing material is already at a temperature between 250° and 650° C., or by applying the solution onto the reinforcing material and by successively heating the so-treated reinforcing material to the above-mentioned temperature.

The temperature from 250° to 650° C. is selected so as to bring about the hydrolysis of the metal organic compound, but not its pyrolysis nor a deformation of the reinforcing material.

Because of such temperature, in the presence of water vapour, organic radicals (OZ) of the metal compound hydrolyze and yield hydroxyl radicals that partially bind, by condensation, to the hydroxyl radicals existing on the surface of the reinforcing material, for example glass fibers, thus forming a thin film (whose thickness generally ranges from 1 to 0.5$\mu$) consisting of a hydrated metal oxide chemically bound to the reinforcing material surface and perfectly adhering to such surface.

Making reference to a reinforcing material consisting of glass fibers, the reaction that, according to an assumption, is supposed to occur on its surface in consequence of the application of the aqueous solution thereonto and of the heating described hereinbefore, may be schematically simplified as follows:

glass fiber surface

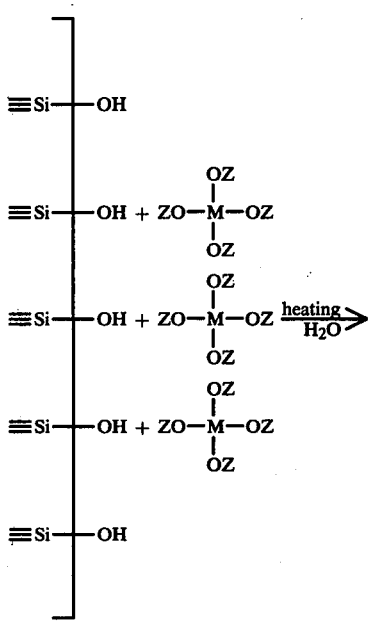

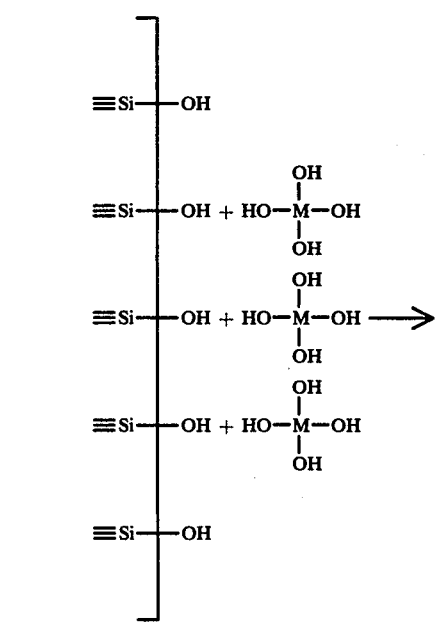

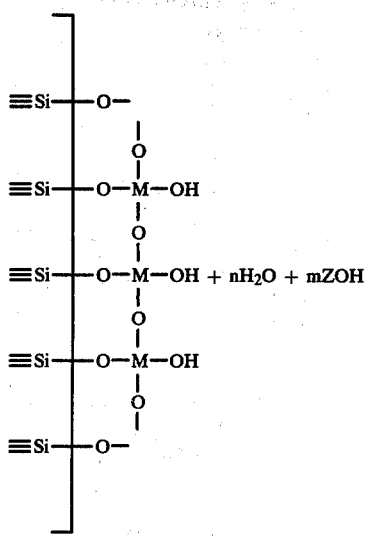

The amount of organic compound of the metal in solution may vary within wide limits, but is generally from 0.1% to 10% by weight. p The abovesaid solution can be applied onto the reinforcing material surface according to any well known method of the art, such as, for example, spraying, atomizing, dipping and the like.

The reinforcing material, once subjected to such treatment, is cooled, whereupon, always according to the present invention, a silane coupling agent known per se in the art is applied onto its surface.

Said silane coupling agents have the following general formula:

wherein:
n is 0, 1, 2 or 3;
(OR) is an organic radical hydrolyzable at room temperature in the presence of water, bound to silicon, and in which R may be either an alkyl or an acyl radical;
X is an organofunctional radical promoting the adhesion of the treated reinforcing material to the plastic material; such radical may be: chlorine, a vinyl group [—CH=CH$_2$], a methacryloxy group [—OO-C—C(CH$_3$)=CH$_2$], an amino group [—NH$_2$], a glycidoxy group

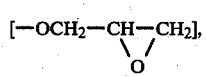

a mercaptyl group [—SH], or an epoxycyclohexyl group

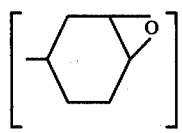

Amongst the commercially known silane coupling agents useful for the present invention, we may cite, for example, vinyltriethoxy-silane, vinyl-tri-(β-methoxyethoxy)-silane, vinyltriacethoxy-silane, γ-aminopropyltriethoxysilane, N-β-(aminoethyl)-γ-aminopropyltriethoxysilane, γ-glycidoxypropyltrimethoxysilane, γ-mercaptopropyltrimethoxysilane, β-(3,4-epoxycyclohexyl)-ethyl-trimethoxysilane, γ-chloropropyltrimethoxysilane, γ-methacryloxy-propyl-trimethoxysilane. The silane coupling agent hydrolizes in an aqueous solution at room temperature.

"Aqueous solution" shall mean also a hydroalcoholic solution or an aqueous or hydroalcoholic dispersion.

According to this invention, as mentioned above, the silane coupling agent is generally dissolved in water, or in hydroalcoholic mixtures, at room temperature, thus obtaining an aqueous solution in which said coupling agent hydrolyzes, thus forming the corresponding silane triols and also, partially, by condensation of the silane to siloxanoles, according to the following reaction scheme:

and partially also:

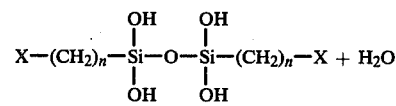

or:

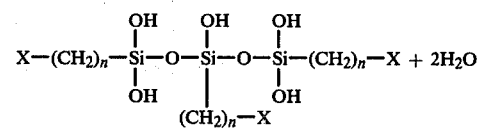

and so on.

This solution is then applied onto the reinforcing material surface, e.g. the glass fibers, previously treated—as described hereinbefore—with the solution of the metal organic compound, and finally the material so treated is subjected to drying at a temperature between 100° C. and 200° C.

The hydroxyl groups bound to the silicon of the coupling agent bind themselves chemically, by condensation, to the hydroxyl radicals of the hydrated metal oxide chemically bound and adhering to the reinforcing material surface, so forming an organo-siloxy-metalloxane polymer, that becomes grafted on the reinforcing material surface and promotes, through organofunctional radicals X present in the organo-siloxy-metalloxane polymer, the desired adhesion to the plastic matrix.

Making reference to a reinforcing material consisting of glass fibers, the reaction that, always according to an assumption, is supposed to occur on the surface, in consequence of the application thereonto of the aqueous solution of the silane coupling agent, may be schematically represented in the following simple form:

glass fiber surface

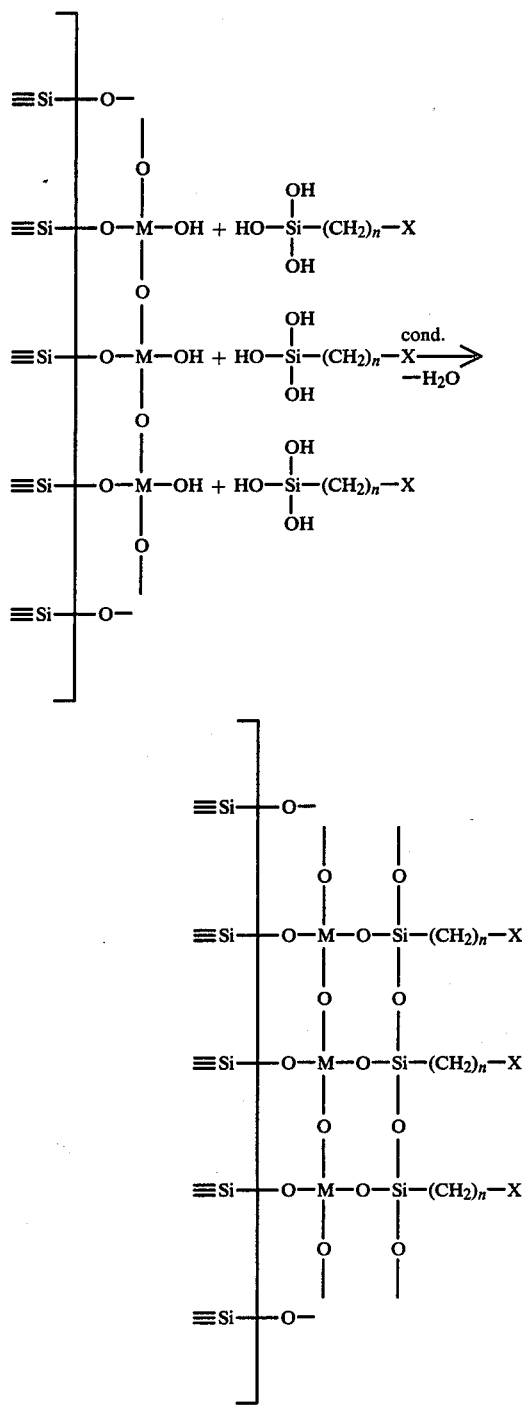

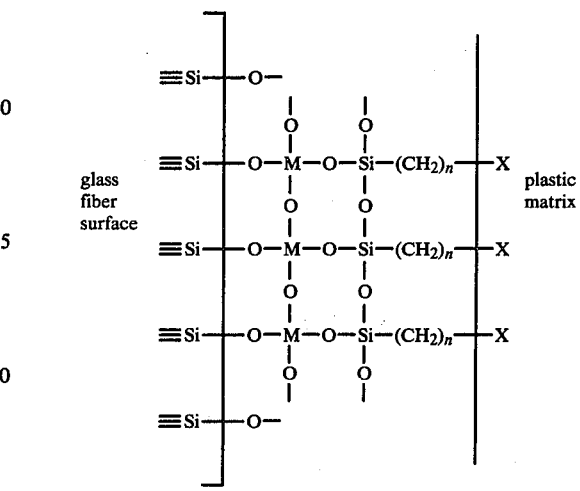

The application of the said solution onto the reinforcing material surface may be carried out according to any conventional technique, but preferably, however, by dipping or wetting.

Along with the coupling agent it is possible to apply simultaneously, according to the requirements, a film-forming, lubricating, sizing and antistatic agent.

The reinforcing material treated according to this invention is suitably employed with the resin to obtain reinforced composite materials.

Organofunctional radicals X of the organosiloxy-metalloxane polymer, adhering and chemically grafted to the reinforcing material surface, bring about a linkage with the resin of the plastic material to be reinforced, thus promoting the adhesion.

The reaction can be represented in a simplified form by the following scheme:

When practicing the process according to this invention it is very important to observe the succession of the operations previously described.

As already pointed out hereinbefore, it is of essential importance that the hydrolysis of the organic compound of the metal should directly occur on the reinforcing material surface, avoiding, however, pyrolysis of the compound itself.

Essential as well is that the application of the coupling agent solution onto the reinforcing material surface should occur separately from the application of the solution of the metal organic compound.

The reinforcing materials treated according to this invention are useful in the industrial manufacture of shaped and profiled articles made of thermoset resins, as well as of thermoplastic resins such as PVC and vinyl chloride copolymers, polyethylene, polypropylene, polyamides, and the like. As matrixes for the production of plastics reinforced with materials treated in accordance with the present invention it is possible to employ thermoset resins in general, in particular the resins based on unsaturated polyesters, but epoxy resins, urea-formaldehyde polycondensation resins, phenolic resins, melamine-formaldehyde resins are also suited to the purpose.

For producing reinforced plastic materials, one can use, as matrixes, also polyamide resins, copolymers of styrene such as ABS resins, polyethylene, polypropylene, polycarbonate, acetalic resins, thermoplastic polyester resins and the like.

The percentage of reinforcing material used may vary within wide limits; generally, in the formulations based on thermoset resins it ranges from 20 to 70% by weight, but it can reach also 97% when the thermoset resin is used as binder of a filler; while in the reinforced thermoplastic compounds such percentage generally varies from 10 to 50%. The glass fibers reinforcing material may consist of roving, chopped strand, cut or continuous filament mat, fabric, web, strand, etc.

The application of the reinforcing material to the thermoset resin containing suitable accelerators and catalysts is carried out under hot or cold conditions according to convention al impregnation or blending techniques. Successively, molding in properly designed molds is carried out having recourse optionally to heat-treating under pressing.

Other forming processes are extrusion, centrifugation, winding, molding under vacuum, etc.

The transformation of thermoplastic resins comprises, conversely, a preliminary blending of the resin in powder form with the reinforcing material consisting of chopped strand or roving, with successive granulation, or a blending of fibers with the resin mass already fluid, or other similar techniques.

The granules of the resulting compound are successively processed according to conventional forming techniques, such as, for example, injection-molding, drawing, pressing etc.

The following examples are given in order still more clearly to illustrate and compare the invention with the prior art.

EXAMPLE 1

Operating according to this invention, 100 g of a sample consisting of soda-lime glass microspheres having a diameter of about 30μ, were dipped, at room temperature, into an aqueous solution containing 98 parts by weight of distilled water and 2 parts by weight of zirconium tetraacetate. The microspheres were then separated from the liquid by filtration, were dried in an air circulation over at a temperature of about 120° C. for approximately 10 minutes and subsequently subjected, in a small furnace, to a 15 minute heat-treating at about 520°-530° C. After cooling, the microspheres sample was dipped at room temperature into an aqueous solution containing 0.3% by weight of γ-aminopropyltrie-thoxysilane and, after separation from the liquid, it was dried for 1 hour at about 120° C.

The microspheres so treated exhibited a surface modified by grafting, according to the invention, of organo-siloxy-zirconoxane polymers. A blend was prepared containing 97 parts by weight of microspheres treated as specified hereinabove and 3 parts by weight of a phenolic resin (Pliophen 5671, manufactured by Reichhold Chemical Co.); the blend was then cured at about 235° C. for 7 minutes. Standard specimens were finally obtained, that were subjected to tensile strength tests according to standard ASTM D 638. Conversely, standard controls were prepared from a blend containing the same phenolic resin and the same microspheres treated, however, only with the solution of γ-aminopropyltrie-thoxysilane, employing the same ratios by weight and operating under identical conditions. The average values for the tensile strength test are reported in the following table.

| Mechanical properties of a phenolic resin compound Pliophen 5671 filled with glass microspheres - | | |
|---|---|---|
| | tensile strength (psi) | |
| | dry method | wet method* |
| Phenolic resin specimens, filled with microspheres having their surface modified by grafting of organo-siloxy-zirconoxane polymers: | 390 | 375 |
| Controls: | 385 | 210 |

*The specimens were conditioned for 16 hours in water at 50° C.

As one may notice, the tensile strength of the composite filled with soda-lime glass microspheres having a modified surface structure according to the invention, remains almost unchanged even after a long-lasting dipping in water, while the controls exhibit a substantial worsening of the mechanical strength after conditioning in water.

EXAMPLE 2

Always operating according to the present invention, a solution was prepared in demineralized water containing 1% by weight of the ester of zirconium acid with sorbitol, obtained according to the method described in German patent DBP No. 1,014,090 of Titangesellschaft m.b.H. The solution was atomized under pressure, through an airless process, by directing the jet onto a bundle of glass fibers coming out from a nozzle during the production of continuous E glass fibers, in proximity of the zone where the glass filaments reached a temperature of about 560° C. The E glass had the following general composition in percent by weight:
$SiO_2 = 55\%$; $Al_2O_3 + Fe_2O_3 = 14.5\%$; $B_2O_3 = 8.5\%$; $CaO = 17\%$; $MgO = 4.5\%$; $Na_2O + K_2O = 0.5\%$.

The production rate of the nozzle was about 30 kg/h, of glass while the atomizer rate was about 0.6 l/h of solution. After previous cooling to room temperature according to conventional techniques, sizing was carried out by wetting the glass fibers by means of a rotating graphite cylinder, partially dipped in a tank containing the sizing bath. Such sizing bath was made up of an aqueous dispersion at 4.15% by weight of polyvinyl acetate as film-forming agent, of 0.2% by weight of dispersed γ-methacryloxypropyltrimethoxysilane as coupling agent, and, finally, of 0.1% by weight of spinning auxiliary materials (a conventional lubricant and a conventional antistatic agent). The yarn, whose count was about 45 Tex, was wound round coils by means of winding machines and then subjected to drying for 6 hours in a thermoregulated oven. Successively, after conditioning at controlled environmental moisture conditions (65% of relative humidity) at room temperature for 24 hours, the yarn was chopped, according to conventional methods, to obtain short glass fibers, having a length of about 6 mm.

A blend was prepared, that consisted of 33% by weight of an unsaturated polyester resin, Paraplex P-43 (manufactured by Union Carbide Corp.) admixed with 1% of catalyst Superco ATC (produced by Union Carbide Corp.), of 19% by weight of the above-said short glass fibers exhibiting their surface modified by grafting, according to this invention, of organo-siloxyzirconoxane polymers, and of 48% by weight of calcined alumina Whitenex (produced by Freeport-Kaolin Comp., USA), such blend being cured at about 160° C. for 10 minutes. Standard specimens were finally obtained, which were subjected to flexural strength tests according to standard ASTM D 790. Controls were conversely prepared from a blend containing the same unsaturated polyester resin and the same components, except that use was made, as reinforcing material, of glass fibers subjected only to the above-mentioned sizing, employing always the same ratios by weight and operating under the same conditions. The mean flexural strength values are reported in the following table.

| Mechanical properties of an unsaturated polyester resin composite, reinforced with glass fibers containing alumina as a filler - | | |
|---|---|---|
| | Flexural strength (psi) | |
| | dry method | wet method* |
| Specimens of reinforced polyester resin, with glass fibers whose surface is modified by grafting of an organo-siloxyzirconoxane polymer: | 23,500 | 18,000 |
| Controls: | 17,500 | 13,300 |

*The specimens were boiled in water for 8 hours.

As may be observed, the flexural strength of the composites reinforced with glass fibers having the surface structure modified according to the present invention, is quite higher than the flexural strengths determined on controls reinforced with glass fibers usually treated according to the conventional technique.

EXAMPLE 3

From a soda-lime glass yarn (glass A) characterized by the following code BS 3396/2/P6/225/A, desized with solvent, 5×5 cm specimens were obtained. Glass A has the following general composition in percent by weight:

$SiO_2 = 73\%$;   $Al_2O_3 + Fe_2O_3 = 1.5\%$;   $CaO = 9\%$; $MgO = 3.5\%$; $Na_2O + K_2O = 13\%$.

An aqueous solution at 1% by weight of isopropylzirconate polymer complexed with triethanolamine and glycerine was prepared. Such complex was obtained by reacting 10.6 g of isopropylzirconate polymer (Zr content=about 37% by weight) with 22.3 g of triethanolamine at 120° C., under uniform stirring for about 15 minutes; successively, 13.8 g of glycerine were admixed, continuing the heating and stirring for further 15 minutes.

After cooling, the viscous liquid was dissolved in demineralized water to obtain a solution at 1% by weight of the water-soluble zirconium complex.

Operating according to this invention, specimens of soda-lime glass (glass A) yarn were dipped into said solution and air-dried at 120° C. for about 10 minutes, and finally subjected to heat-treating for 15 minutes at about 550°–560° C. After cooling, the treated specimens were dipped into an aqueous solution at 0.4% by weight of vinyltriethoxysilane at room temperature, and dried at 120° C. for about 1 hour.

The yarn samples exhibited, after the aforesaid treatment, an excellent resistance to hydrolytic attack; furthermore, the organo-siloxyzirconoxane polymer grafted onto the glass surface and promoting the adhesion, retained unchanged its properties even after a long-lasting exposure to water vapour.

The glass yarn samples surface treated according to the foregoing, were subjected to control tests in order to evaluate the effectiveness of the organo-siloxyzirconoxane polymer grafted onto the glass surface.

The controls were prepared by dipping the samples made of soda-lime glass (glass A) yarn only into an aqueous solution at 0.4% by weight of vinyltriethoxysilane as coupling agent, whereupon they were dried at 120° C. for 1 hour.

The following results were obtained:

| Determination of the contact angle of water on glass | |
|---|---|
| Surface treatment | Mean values of the contact angle |
| Glass yarn samples having the surface structure modified by grafting of an organo-siloxyzirconoxane polymer according to the process of this invention: | $\theta = 68°$ |
| Glass yarn samples treated only with the silane coupling agent (vinyltriethoxysilane): | $\theta = 54°$ |

The contact angles were measured again after hydrolytic attack of the yarn glass surfaces in the presence of water vapour by means of a 60-minute treatment in an autoclave at 121° C., the following results having been obtained:

| | |
|---|---|
| Samples of glass yarn having their surface structure modified by grafting of an organo-siloxyzirconoxane polymer in accordance with the process of this invention as described hereinbefore: | $\theta = 60°$ |
| Samples of glass yarn treated with the coupling agent only (vinyltriethoxysilane): | $\theta = 25°$ |

As one may observe, the contact angle exhibits a slight decrease, after the hydrolytic attack, only in the case of samples treated according to the process of this invention.

Conversely, the great decrease of the contact angle of the controls in consequence of the hydrolytic attack, is clearly indicative of a destruction or an alteration of the agent promoting the adhesion owing to the hydrolytic attack itself. Therefore, the adhesive power of the controls to a plastic matrix become strongly reduced.

The slight decrease of the contact angle of the glass yarn sample treated according to the present invention, proves that its properties of adhesion to the plastic matrix remain unchanged also after a prolonged exposure to water vapour and to moisture during storage or handling of the glass yarn prior to the use of same in the field of reinforced plastics.

EXAMPLE 4

5×5 cm samples were obtained from a sode-lime (glass A) yarn characterized by code BS 3396/2/P6/225/A, desized with solvent. An aqueous solution at 1% by weight of zirconium tetraacetate was prepared.

According to the operational procedures of this invention, samples were dipped into said solution and were air-dried at 120° C. for about 10 minutes, and finally they were subjected to a 15-minutes heat-treating at 550°–560° C.

After cooling, the treated samples were dipped in an aqueous solution containing 0.4% by weight of γ-methacryloxy-propyltrimethoxy-silane at room teperature, and were dried at 120° C. for about 1 hour. After such treatment, the yarn samples exhibited good characteristics of resistance to hydrolytic attack and, in consequence, unchanged properties of adhesion to the plastic matrix even after prolonged residence in moisture.

The glass samples surface treated according to the above procedures, were subjected to control tests in order to evaluate the activity of the organo-siloxyzirconoxane polymer grafted onto the glass surface.

The controls were prepared only by dipping into an aqueous solution at 0.4% by weight of γ-methacryloxypropyltrimethoxy-silane and by drying at 120° C. for 1 hour.

The following results were obtained:

| Determination of the contact angle of water on glass | |
|---|---|
| Surface treatment | Contact angle, mean values |
| Glass yarn samples with surface structure modified by grafting of an organo-siloxy-zirconoxane polymer conforming to the above-described process of this invention: | $\theta = 52°$ |
| Glass yarn samples treated only with the silane coupling agent ($\gamma$-methacryloxy-propyltrimethoxy-silane): | $\theta = 55°$ |

The contact angles were measured again after hydrolytic attack of the yarn glass surfaces, in the presence of water vapour by means of a 60-minute treatment in an autoclave at 121° C., and the following results were obtained:

| | |
|---|---|
| Glass yarn samples with surface structure modified by grafting of an organo-siloxy-zirconoxane polymer according to the above-described process of the invention: | $\theta = 50°$ |
| Samples made of glass yarn treated only with the coupling agent ($\gamma$-methacryloxypropyl-trimethoxy-silane): | $\theta = 20°$ |

In this case too, the substantial decrease of the contact angles of the controls, owing to the hydrolytic attack, is clearly indicative of the destruction of the adhesion-promoting agent, and therefore, implicity, of a decay of the adhesion properties of the glass yarn to a plastic matrix.

Conversely, the negligible decrease of the contact angle of the glass yarn samples treated according to the present invention, proves that the adhesion properties to the plastic matrix remain unchanged also after a prolonged exposure to water vapour and moisture.

EXAMPLE 5

Following the operational procedures of this invention, 100 g of soda-lime glass microspheres of about 30μ diameter were dipped, at room temperature, into an aqueous solution at 1% by weight of diisopropyl-ditriethanolamine stannate. After filtering and drying at 120° C. for approximately 10 minutes, a heat-treating was carried out for about 15 minutes in a furnace at approximately 530°–540° C.

The sample was allowed to gradually cool down to room temperature, whereupon a treatment was conducted at room temperature with an aqueous solution containing 0.35% by weight of $\gamma$-glycidoxypropyl-trimethoxysilane, and then drying at 120° C.

The microspheres so treated exhibited a surface modified by grafting, according to this invention, of organo-siloxystannoxane polymers. A blend was prepared containing 97 parts by weight of microspheres treated according to the above procedure, and 3 parts by weight of a phenolic resin (Pliophen 5671, manufactured by Reichhold Chemical Co.): the blend was then cured at about 235° C. for 7 minutes. Standard specimens were finally obtained, which were subjected to tensile strength tests according to standard ASTM D 638. Standard controls were conversely prepared from a blend containing the same phenolic resin and the same microspheres, but treated only with the solution of $\gamma$-glycidoxy-propyltrimethoxysilane, but operating according to the same ratios by weight and under the same conditions.

The mean values of the tensile strength tests according to standard ASTM D 638 are reported in the following table.

| Mechanical characteristics of a phenolic resin (Pliophen 5671) composite filled with soda-lime glass microspheres. | | |
|---|---|---|
| | Tensile strength (psi) | |
| | dry method | wet method* |
| Specimens of phenolic resin filled with glass microspheres, whose surface was modified by grafting of organo-siloxystannoxane polymers: | 350 | 330 |
| Controls: | 320 | 130 |

*The specimens were conditioned in water at 50° C. for 16 hours.

As one may notice, the tensile strength of the compounds filled with soda-lime glass microspheres having the surface structure modified according to the present invention, remains almost unchanged even after prolonged dipping in water, while the controls exhibit a substantial decay of the mechanical strength after conditioning in water.

The advantages of this invention clearly result from the preceding description; they may be summarized as follows: improved adhesion between reinforcing material and plastic matrix, permanent adhesion properties also in the presence of water vapour and moisture, and possibility of storing and handling the reinforcing material, without any alterations of same due to environmental conditions, before its utilization.

What we claim is:

1. A process for imparting a better adhesion between reinforcing material and plastic matrix, characterized in that said process comprises the steps of
    (a) treating the reinforcing material surface at a temperature ranging from 250° to 650° C.; with at least one organic compound of a tetravalent metal having the formula:

$$M(OZ)_4$$

wherein:
    M is Zr or Sn;
    (OZ) is an organic radical non-hydrolyzable at room temperature in the presence of water, but hydrolyzable in the presence of water vapor at a temperature between 250° and 650° C.; or a polymeric derivative thereof with a linkage of the type $$\begin{array}{c} \phantom{-}OZ \phantom{M} OZ \\ \phantom{-}| \phantom{MMM} | \\ -M-O-M- \\ \phantom{-}| \phantom{MMM} | \\ \phantom{-}OZ \phantom{M} OZ; \end{array}$$

(b) applying onto the thus treated reinforcing material surface at a lower temperature, at least one silane coupling agent having the formula:

$$(OR)_3Si(CH_2)_nX$$

wherein:
    n is 0, 1, 2 or 3;
    (OR) is an organic radical hydrolyzable at room temperature in the presence of water, bound to silicon, and in which R is an alkyl or acyl radical;

X is an organo functional radical promoting the adhesion of the treated reinforcing material to the plastic material; such as chlorine, a vinyl, methacryloxy, amino, glycidoxy, mercaptyl, or an epoxycyclohexyl group;

(c) drying the thus treated reinforcing material.

2. Process according to claim 1, characterized in that said organic compound of the tetravalent metal is selected from the group consisting of esters of zirconium acid, amino-alkyl-zirconates and amino-alkyl-stannates.

3. Process according to claim 1, characterized in that said organic compound of the tetravalent metal is an ester of zirconium acid with water-soluble polyvalent alcohols containing from 3 to 6 carbon atoms and at least 3 hydroxyl radicals.

4. Process according to claim 1, characterized in that said organic compound of the tetravalent metal is an amino-alkyl-zirconate prepared by reacting water-soluble amino-alcohols with zirconium dioxy-hydrate.

5. Process according to claim 1, characterized in that said organic compound of the tetravalent metal is an amino-alkyl-zirconate obtained by reacting water-soluble amino-alcohols with zirconium alcoholates.

6. Process according to claim 1, characterized in that said organic compound of the tetravalent metal is zirconium tetraacetate.

7. Process according to claim 1, characterized in that said organic compound of the tetravalent metal is an amino-alkyl-stannate prepared by reacting water-soluble amino-alcohols with tin alcoholates.

8. Process according to claim 1, characterized in that said organic compound of the tetravalent metal is di-isopropyl-ditriethanolamine-stannate.

9. A process of claim 1, wherein said organic compound has the formula

$M(OZ)_4$.

10. A process of claim 1, wherein said organic compound is in the form of said polymeric derivative.

11. A process of claim 10, wherein M is Zr and said polymeric derivative has a linkage of the formula

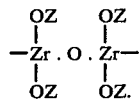

12. Process according to claim 11, characterized in that said polymeric derivative is a polymeric zirconate complexed with water-soluble amino-alcohols and water-soluble polyvalent alcohols, the latter containing from 3 to 6 carbon atoms and at least 3 hydroxyl radicals.

13. Process according to claim 12, characterized in that said polymeric zirconate is isopropylzirconate polymer complexed with triethanolamine and glycerine.

14. Process according to claim 1, characterized in that the temperature, at which the reinforcing material surface is treated with the organic compound of the tetravalent metal, is between 350° C. and 550° C.

15. Process according to claim 1, characterized in that the heating, up to a temperature ranging from 250° C. to 650° C., at which the reinforcing material surface is treated with the organic compound of the tetravalent metal, is effected by applying said compound onto the reinforcing material that is already at a temperature between 250° C. and 650° C., or by applying said compound onto the reinforcing material, and by successively heating the reinforcing material, so treated, to a temperature ranging from 250° C. to 650° C.

16. Process according to claim 1, characterized in that said coupling agent is selected from the group consisting of vinyltriethoxysilane, vinyltriacethoxysilane, γ-aminopropyltriethoxysilane, N-β-(aminoethyl)-γ-aminopropyltriethoxysilane, γ-glycidoxypropyltrimethoxysilane, γ-mercaptopropyltrimethoxysilane, β-(3,4-epoxycyclohexyl)ethyl-tri methoxysilane, γ-chloropropyltrimethoxysilane, and γ-methacryloxypropyltrimethoxysilane.

17. A coated reinforcing material for a plastic matrix comprising a reinforcing material coated with an organosiloxymetalloxane polymer to impart enhanced adhesion between said reinforcing material and said plastic matrix, characterized in that said reinforcing material has been subjected to the process comprising the steps of (a) treating the reinforcing material surface at a temperature ranging from 250° C. to 650° C.; with at least one organic compound of a tetravalent metal having the formula:

$M(OZ)_4$ wherein:

M is Zr or Sn;

(OZ) is an organic radical non-hydrolyzable at room temperature in the presence of water, but hydrolyzable in the presence of water vapor at a temperature between 250° and 650°; or a polymeric derivative thereof with a linkage of the type

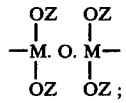

(b) applying onto the thus treated reinforcing material surface at a lower temperature, at least one silane coupling agent having the formula:

$(OR)_3Si(CH_2)_nX$ wherein:

n is 0, 1, 2 or 3

(OR) is an organic radical hydrolyzable at room temperature in the presence of water, bound to silicon, and in which R is an alkyl or acyl radical;

X is an organo functional radical promoting the adhesion of the treated reinforcing material to the plastic material; such as chlorine, a vinyl, methacryloxy, amino, glycidoxy, mercaptyl, or an epoxycyclohexyl group;

(c) drying the thus treated reinforcing material.

18. A coated reinforcing material of claim 17, wherein said organic compound has the formula

$M(OZ)_4$

19. A coated reinforcing material of claim 17, wherein said organic compound is in the form of said polymeric derivative.

20. A coated reinforcing material of claim 19, wherein M is Zr and said polymeric derivative has a linkage of the formula

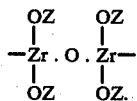

21. A coated reinforcing material of claim 17, characterized in that said organic compound of the tetravalent metal is selected from the group consisting of esters of zirconium acid, amino-alkyl-zirconates and amino-alkyl-stannates.

22. A coated reinforcing material of claim 17, characterized in that said organic compound of the tetravalent metal is an ester of zirconium acid with water-soluble polyvalent alcohols containing from 3 to 6 carbon atoms and at least 3 hydroxyl radicals.

23. A coated reinforcing material of claim 17, characterized in that said organic compound of the tetravalent metal is an amino-alkyl-zirconate prepared by reacting water-soluble amino-alcohols with zirconium dioxyhydrate.

24. A coated reinforcing material of claim 17, characterized in that said organic compound of the tetravalent metal is an amino-alkyl-zirconate obtained by reacting water-soluble amino-alcohols with zirconium alcoholates.

25. A coated reinforcing material of claim 17, characterized in that said organic compound of the tetravalent metal is zirconium tetra-acetate.

26. A coated reinforcing material of claim 17, characterized in that said organic compound of the tetravalent metal is an amino-alkyl-stannate prepared by reacting water-soluble amino-alcohols with tin alcoholates.

27. A coated reinforcing material of claim 17, characterized in that said organic compound of the tetravalent metal is di-isopropyl-ditriethanolamine-stannate.

28. A coated reinforcing material of claim 20, characterized in that said polymeric derivative is a polymeric zirconate complexed with water-soluble amino-alcohols and water-soluble polyvalent alcohols, the latter containing from 3 to 6 carbon atoms and at least 3 hydroxyl radicals.

29. A coated reinforcing material of claim 28, characterized in that said polymeric zirconate is isopropylzirconate polymer complexed with triethanolamine and glycerine.

30. A coated reinforcing material of claim 17, characterized in that the temperature, at which the reinforcing material surface is treated with the organic compound of the tetravalent metal, is between 350° C. and 550° C.

31. A coated reinforcing material of claim 17 characterized in that the heating, up to a temperature ranging from 250° C. to 650° C., at which the reinforcing material surface is treated with the organic compound of the tetravalent metal, is effected by applying said compound onto the reinforcing material that is already at a temperature between 250° C. and 650° C., or by applying said compound onto the reinforcing material, and by successively heating the reinforcing material, so treated, to a temperature ranging from 250° C. to 650° C.

32. A coated reinforcing material of claim 17, characterized in that said coupling agent is selected from the group consisting of vinyltriethoxysilane, vinyltriacethoxysilane, γ-aminopropyltriethoxysilane, N-β-(aminoethyl-γ-aminopropyltriethoxysilane, γ-glycidoxypropyltrimethoxysilane, δ-mercaptopropyltrimethoxysilane, β-(3,4-epoxycyclohexyl)ethyl-tri-methoxysilane, γ-chloropropyltrimethoxysilane, and γ-methacryloxypropyltrimethoxysilane.

* * * * *